July 30, 1963  J. E. THOMPSON  3,099,561
SEPARATION PROCESS
Filed Feb. 12, 1960

INVENTOR.
John E. Thompson
BY
Holcombe, Wetherill & Brisebois
ATTORNEYS

United States Patent Office 3,099,561
Patented July 30, 1963

3,099,561
SEPARATION PROCESS
John E. Thompson, 908 Burns Drive, Flossmoor, Ill.
Filed Feb. 12, 1960, Ser. No. 8,324
7 Claims. (Cl. 99—7)

This invention relates to the separation of products such as dry rendered tankage into its various constituents.

When a fat containing material is so treated as to remove the fat, a solid product is obtained. One method is by rendering, and the solid product obtained is known as dry rendered tankage. For purposes of illustration in this application dry rendered tankage is used, but this invention is not limited to this specific material as all types of solid material remaining after the removal of the fat from fat containing materials are useable.

Heretofore dry rendered tankage has been disposed of by slaughter houses just as it is separated from the rendered fat and has been sold on a protein basis.

This invention has for its object the separation of the proteinaceous material, the bone and the fat into three separate constituents from dry rendered tankage.

It is another object of this invention to separate any extraneous impurity, such as hair, sawdust or metal scraps from the light and the heavy constituents of the dry rendered tankage.

It is a still further object of this invention to obtain from dry rendered tankage proteinaceous constituents thereof that may be used to increase the protein value of certain animal foods.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which have been illustrated and described the preferred embodiment of the invention.

When fat is rendered the solid material that separates therefrom is removed, and comprises a light portion and a heavy portion, as well as the retained fat adhering thereto. A typical analysis of such material as obtained from a sample of cracklings produced by a meat packer, comprises a solid material containing approximately 25% bone meal, 55% protein, 10% fat and 10% moisture. On solvent extraction the fat may be removed and would include any component which is extractable by the solvent used, that is, color bodies, mineral oil, etc. The light solids, mostly dried soft tissue would be high in protein when obtained from good quality dry rendered tankage. It would also include any light contaminant or adulterant that might be in the raw material, that is hair or sawdust. The heavy solids, mostly bone, when obtained from good dry rendered tankage would include contaminants or adulterants of high density, such as sand, glass, metal scraps, etc. The dry rendered tankage is first run through a hammer mill or treated by other methods for subdividing material so that it will give a product that will pass through a 10 mesh screen and be retained on a 20 mesh screen.

Figure 1:
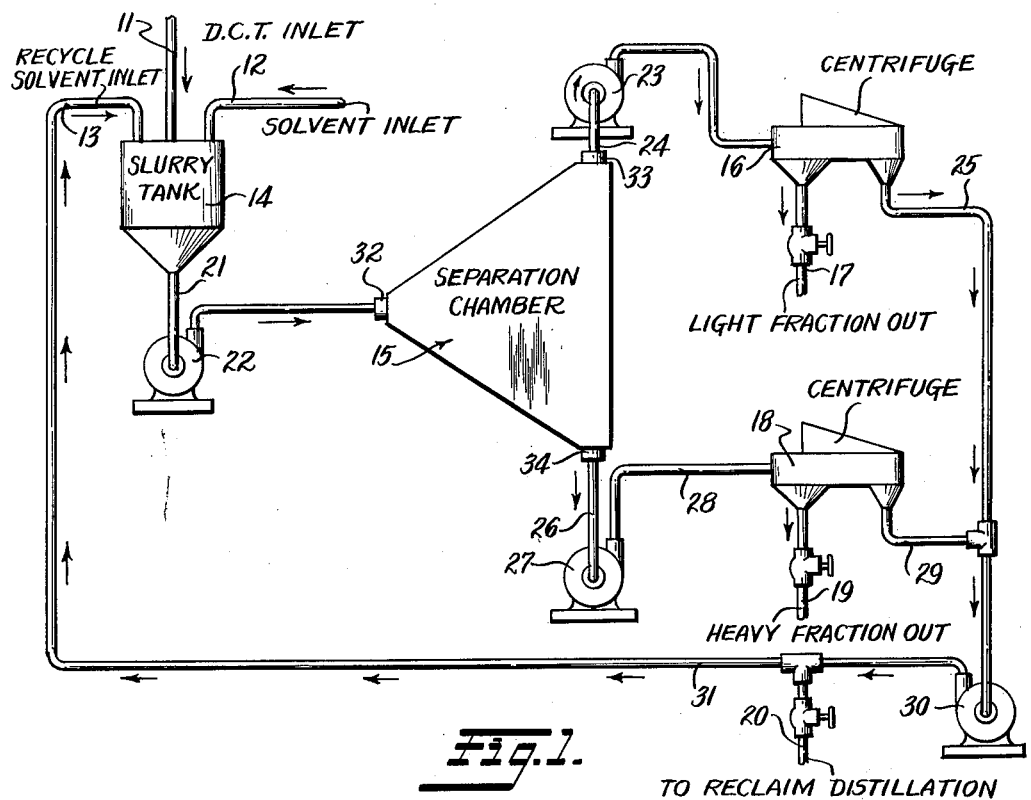
FIGURE 1 is a flow diagram of the preferred embodiment of this invention.

The dry rendered tankage is introduced through the conduit 11 and a solvent, such as carbon tetrachloride is introduced through the conduit 12, both of these admitted through respective materials to the slurry tank 14. The slurry from the bottom of this tank is passed by means of the conduit 21 through the pump 22 to the separating chamber 15 and is admitted at inlet port 32 at the side of this chamber, as shown in FIG. 1. This chamber allows the flow of the material across the chamber in an even manner where the flow of the material decreases as it progresses from the inlet in the chamber. The light material rises to the top of this chamber and is removed by the pump 23 through the conduit 24 and delivers the slurry of the light material and a solvent to the centrifuge 16, where the solvent is removed from the light constituent, the solvent being removed from the centrifuge by the conduit 25 and the light constituent through the conduit 17. The heavy constituent is removed from the bottom of the separation chamber 15 by means of the conduit 26 passing through the pump 27 and is admitted by means of the conduit 28 to the centrifuge 18, where the heavy constituents are removed from the centrifuge by means of the conduit 19 and the solvent is removed from the centrifuge by means of the conduit 29. The flow of the solvent in the conduits 25 and 29 is controlled by means of the pump 30 operating through the conduit 13 into the slurry tank 14.

A certain portion of the solvent and its dissolved fatty material is removed from the conduit 31 by means of the valve 20 and passed to a distillation unit (not shown) where the solvent is separated from the fat, which solvent, after separation is readmitted to the process through the conduit 12.

Figure 2:
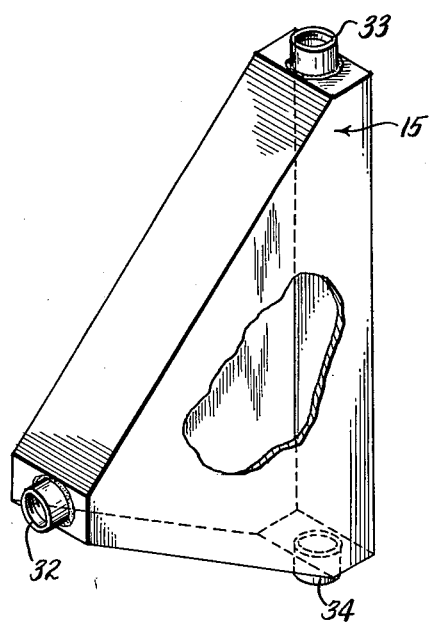
FIG. 2 is a plan view of the separation chamber shown in FIG. 1.

The separation chamber referred to above is shown in detail in FIG. 2 and is generally triangular in shape. The solvent and the suspended material is admitted on the side through the opening 32 and flows across the chamber to the outlets 33 and 34 therefrom, the outlet 33 being at the top allows the lighter material floating with the solvent to be removed therefrom and the outlet 34 being at the bottom allows the heavy constituent admixed with the solvent to be removed from the bottom at this point. It is readily seen that the rate of flow of the solvent within the chamber decreases progressively as the material moves across the chamber thereby allowing the lighter constituent and the heavy constituent to separate within the chamber due to gravity separation. The solvent used in this modification of the invention is intermediate in density between the heavy constituent and the light constituent and thereby produces a sink-float type of separation, while the fatty constituents are dissolved in the solvent.

The solvent referred to above in the example is carbon tetrachloride, but any solvent having an intermediate density may be used, such as chloroform, perchloroethylene, tetrachloroethylene, trichloroethane, tetrachloroethane, trichloroethylene and ethyl chloride.

While in accordance with the provisions of the statutes, there has been illustrated and described the best form of embodiment of this invention now known, it will be apparent to those skilled in the art that changes may be made in the form of the apparatus disclosed wtihout departing from the spirit of this invention as set forth in the appended claims, and that in some cases certain features of this invention may be used to advantage without a corresponding use of other features.

What is claimed is:

1. A process for the separation of the constituents of solid dry rendered tankage, which comprises; finely dividing said solid material, mixing the same with an organic fat solvent having a density less than the heavy fractions of said material and greater than the lighter fractions of said material, passing said material and solvent through a separating chamber where the lighter solid fractions are allowed to rise and the heavy solid fractions settle, and removing each of these fractions from said chamber, recovering said fractions free from the solvent and removing said solvent and the dissolved fat from said chamber, separating the fat from the solvent and recirculating the said solvent.

2. A process for the separation of the constituents of dry rendered tankage, which comprises; finely dividing said material, mixing the same with carbon tetrachloride, passing said material and carbon tetrachloride to a separating chamber where the lighter solid fractions are allowed through rise and the heavy solid fractions settle, and removing each of these fractions from said chamber, recovering said fractions free from carbontetrachloride and removing said carbon tetrachloride and the dissolved fat from said chamber, separating the fat from the carbon tetrachloride and recirculating the latter.

3. A process for the separation of the constituents of dry rendered tankage, which comprises; finely dividing said material, mixing the same with tetrachlorethylene, passing said material and tetrachlorethylene through a separating chamber where the lighter solid fractions are allowed to rise and the heavy solid fractions settle, and removing each of these fractions from said chamber, recovering said fractions free from tetrachlorethylene, and removing said tetrachlorethylene and the dissolved fat from said chamber, separating the fat from the tetrachlorethylene and recirculating the latter.

4. A process for the separation of the constituents of dry rendered tankage, which comprises; finely dividing said material, mixing the same with perchlorethylene, passing said material and perchlorethylene through a separating chamber where the lighter solid fractions are allowed to rise and the heavy solid fractions settle, and removing each of these fractions from said chamber, recovering said fractions free from perchlorethylene and removing said perchlorethylene and the dissolved fat from said chamber, separating the fat from the perchlorethylene and recirculating the latter.

5. A process for the separation of the constituents of dry rendered tankage, which comprises; finely dividing said material, mixing the same with chloroform, passing said material and chloroform through a separating chamber where the lighter solid fractions are allowed to rise and the heavy solid fractions settle, and removing each of these fractions from said chamber, recovering said fraction free from chloroform and removing said chloroform and the dissolved fat from said chamber, separating the fat from the chloroform and recirculating the latter.

6. A process for the separation of the constituents of solid dry rendered tankage, which comprises; finely dividing said solid material, mixing the same with an organic fat solvent having a density less than the heavy fractions of said material and greater than the lighter fractions of said material, passing said material and solvent through a separating chamber with a progressively decreasing rate of flow where the lighter solid fractions are allowed to rise and the heavy solid fractions settle, removing each of these fractions from said chamber, recovering said fractions free from the solvent, removing said solvent and the dissolved fat from said chamber, separating the fat from the solvent and recirculating the said solvent.

7. A process for the separation of the coagulated proteins, fats, and bone meal from dry rendered tankage, which comprises; finely dividing said solid material, mixing the same with an organic fatty solvent having a density less than said protein and greater than said bone meal, passing said material and said solvent through a separating chamber with a progressively decreasing rate of flow where the protein is allowed to rise and the bone meal allowed to settle, removing each of these fractions from the chamber, recovering said fractions free from the solvent, removing said solvent and dissolved fat from the chamber, separating the fats from the solid and recirculating the solvent.

References Cited in the file of this patent
UNITED STATES PATENTS

| | | |
|---|---|---|
| 2,536,345 | Bradford | Jan. 2, 1951 |
| 2,567,179 | Bonotto | Sept. 11, 1951 |
| 2,597,230 | Davis | May 20, 1952 |
| 2,619,425 | Levin | Nov. 25, 1952 |
| 2,730,538 | Brabets et al. | Jan. 10, 1956 |
| 2,940,965 | Garwin | June 14, 1960 |